United States Patent [19]

Jouffreau

[11] Patent Number: 4,804,571
[45] Date of Patent: Feb. 14, 1989

[54] REUSABLE THERMAL PROTECTION MEMBER FOR AN OBJECT SUBJECT TO GREAT HEATING

[75] Inventor: Jacques Jouffreau, Montgiscard, France

[73] Assignee: Centre National D'Etudes Spatiales, Paris, France

[21] Appl. No.: 894,771

[22] Filed: Aug. 8, 1986

[30] Foreign Application Priority Data

Aug. 12, 1985 [FR] France .................. 85 12281

[51] Int. Cl.4 ............................................. B64G 1/58
[52] U.S. Cl. ................................ 428/77; 244/158 A; 244/117 A
[58] Field of Search ................. 428/77, 698, 699, 212, 428/285, 286, 457; 244/158 A, 117 A

[56] References Cited

U.S. PATENT DOCUMENTS

| | | | |
|---|---|---|---|
| 3,878,356 | 4/1975 | Royu | 219/150 V |
| 4,124,732 | 11/1978 | Leger | 428/77 |
| 4,151,800 | 5/1979 | Dotts et al. | 102/105 |
| 4,344,591 | 8/1982 | Jackson | 428/604 |
| 4,439,968 | 4/1984 | Dunn | 52/404 |
| 4,456,208 | 6/1984 | MacConochie et al. | 244/158 |

*Primary Examiner*—Nancy Swisher
*Attorney, Agent, or Firm*—Pearne, Gordon, McCoy & Granger

[57] ABSTRACT

The present invention relates to a reusable thermal protection member for an object subject to great heating, e.g. an aircraft or spacecraft.

The member comprises in per se known manner a refractory shield and an insulating layer between the refractory shield and the structure of the craft. According to the invention the refractory shield comprises at least one thin film of refractory material having an adequate flexibility to adapt to the shape of the structure of the craft in the area to be protected.

Application to the thermal protection of aircraft or spacecraft.

24 Claims, 8 Drawing Sheets

REUSABLE THERMAL PROTECTION MEMBER FOR AN OBJECT SUBJECT TO GREAT HEATING

BACKGROUND OF THE INVENTION

The present invention relates to thermal protection and more particularly to reusable protection members which can be used on objects subject to great heating, such as aircraft or spacecraft.

When a spacecraft returning from a random orbit enters the atmosphere, it is subject to very great kinetic heating due to the deceleration exerted on it by the atmosphere. The heating period is dependent on the reentry trajectory and lasts about 15 to 25 minutes. The kinetic flows or fluxes are very considerable at the nose of the craft and on the leading edges of the wings and fins, high on the wing lower surface and on the sides of the aircraft and less high on the wing upper surface, which is still exposed to significant local heating. It is therefore vital to protect the craft to prevent deterioration of the airframe and equipment and even the loss of the craft, because the temperature reached can exceed 1000° C. and even 2000° to 2500° C. at certain places. The effectiveness of the protection must vary from one area to another as a function of the particular thermal flux. The same problems are encountered with a very fast craft which does not leave the atmosphere.

The main method used at present consists of covering the craft with tiles, each of which constitutes an isolated protection member. These tiles must adapt to the curvature of their support and to the cutouts at the location of connections, doors, hatches, etc. Therefore their geometry, varies between individual tiles in three dimensions. Moreover, depending on the location on the craft where they are located, the efficiency required as a function of the thermal flux differs. Thus, the insulation title thicknesses differ and thickness may not be constant for a given tile.

This clearly leads to a certain number of disadvantages due to the fact that the tiles are almost all different. This makes it necessary to have a high number of title specifications, a high production cost rate due to the variety of tools required, a high development and qualification cost due to the numerous installation configurations, and high inspection and control costs because the equipment for the same must be adapted to each tile and numerous qualification tests are required. Finally, the inspections title required between two flights are very long and complicated.

Another method consists of producing rigid and e.g., parallelepipedic members, associating on the one hand one or more refractory shields and on the other an insulating layer. The refractory shield or shields are located on the outside and are therefore exposed to the aerodynamic flow, whilst the insulating layer is between the refractory shield and the craft structure. Optionally, the refractory shields can be wavy in order to aid the compensation of thermal expansions.

This system has the same disadvantages as that based on tiles described hereinbefore, because each rigid member must be designed so that it is adapted to the local thermal and geometrical conditions of the area which it has to cover.

SUMMARY OF THE INVENTION

The present invention aims at eliminating these disadvantages by proposing a reusable thermal protection member, which is inexpensive, easily produced, easily to installed on the object to be protected and easily inspected and maintained.

The thermal protection member acording to the invention for protecting an object subject to great heating comprises, in per se known manner, at least one refractory shield, means for fixing said shield to the object to be protected, an insulating layer between the refractory shield and the object, and means for fixing the insulating layer to said object.

The expression "subject to great heating" used within the present description means that the object to be protected has to withstand temperatures exceeding 1000° C., or even 1200° to 1300° C. or higher and even 2000° to 2500° C. or more.

According to the invention, the refractory shield comprises at least one thin film of refractory material having an adequate flexibility to adapt to the shape of the object in the area to be protected in at least one direction. The refractory material forming the thin film can be a metal, e.g. niobium, titanium, tantalum and the alloys thereof or an alloy based on nickel or chromium. The thin film can also be made from a composite material based on refractory fibres, the material constituting the fibres possibly being carbon, silica or some other refractory material.

The thickness of the thin film is a few tenths of a millimeter, i.e. 0.1 to 0.2 mm if the film is made from metal and 0.6 to 0.8 mm if the film is made from a composite material. The height of the refractory shield with respect to the surface to be protected is approximately 50 mm.

The expression "having a flexibility adequate to adapt to the shape of the object in the area to be protected" means that the thin film is sufficiently flexible to elastically deform to the point of being parallel or quasi-parallel to the surface of the object in the area above which it is located. This arrangement has numerous advantages, the most important being reduction in the production and maintenance costs due to the standardization of the thermal protection members and the fact that they are reusable. These advantages and others will be described hereinafter.

Generally, the thin film is in the form of a rectangular member. The adjective "rectangular" used here designates the general shape of the thin film, because adaptations thereto are possible for cases where the film is to be positioned in the vicinity of a door, hatch or other member outside the craft if the protection member according to the invention is intended for use on an aircraft or spacecraft. If necessary, it can be equipped with rigidification or stiffening means to obtain a better mechanical strength without destroying the flexibility desired for the refractory shield. These stiffening means can e.g. comprise a corrugated sheet placed on the inner face of the thin film, i.e. that facing the insulating layer. It is optionally possible to add a supplementary sheet to improve the mechanical strength of the refractory shield in the case of exceptionally high stressing.

According to another feature of the thermal protection member according to the invention, the latter has means for absorbing the expansion of the refractory shield in at least one direction.

When the refractory shield comprises at least two successive rectangular films, the means for absorbing the linear expansion can consist of a break, dislocation or displacement provided at one end of a film which can freely slide beneath the corresponding edge of the other film, which makes it possible to absorb the expansion of the two films in the longitudinal direction. It is also possible to provide on the film longitudinal corrugations making it possible to absorb the transverse expansion without leading to aerodynamic roughness.

According to another feature of the invention, the means for fixing the refractory shield to the object to be protected fulfil at least one of the following functions:
- maintaining and/or creating the curvature of the refractory shield;
- maintaining the mechanical strength of the refractory shields;
- tolerating linear and transverse expansions of the refractory shields;
- permitting the contiguous fitting of two refractory shields, whose films are not coplanar; and
- ensuring sealing with respect to air, water and plasma.

According to another feature of the thermal protection member according to the invention, the means for fixing the heat shield to the object comprise an elongated ramp on which is placed the edge of the refractory shield, means for fixing this ramp to the object, and means for maintaining the edge of the refractory shield on the ramp.

In a first embodiment, the means for fixing the ramp to the object comprise a shaped section, fixed to the latter and on which is mounted said ramp. In a second embodiment, these fixing means comprise a group of pedestal-like feet or supports fixed to the object and on which is mounted the ramp. The surface of the ramp on which is placed the edge of a refractory shield can be curved, so as to be able to hold two adjacent refractory shields which are not coplanar.

According to another feature of the thermal protection member according to the invention, the means for holding the edge of the refractory shield on the ramp comprise a shaped section fixed to the ramp, said shaped section having at least one curved edge arranged in such a way that the edge of the refractory shield can be positioned between the edge of the shaped section and the ramp, said curved edge having an adequate flexibility to apply the edge of the refractory shield to the ramp.

The insulating layer located between the refractory shield and the structure of the craft can be flexible and can be placed in a protective bag. It can also be rigid and, if necessary, serve as a support to the refractory shield for aiding the constitution or maintaining of the curvature of the latter. From the optimization standpoint, it can also be a hybrid, i.e. partly rigid, e.g. produced in the form of a wafered sheet on which the refractory shield bears, thus defining contiguous pockets on the surface to be protected and partly flexible in the thus defined pockets.

In a preferred embodiment, the means for fixing the refractory shield to the object are also used for fixing the insulating layer to said object. Finally, it is possible to provide a supplementary sheet serving as an emergency thermal protection. This supplementary sheet can be interposed between the refractory shield and the insulating layer or between the latter and the object to be protected.

BRIEF DESCRIPTION OF THE DRAWINGS

The invention is described in greater detail hereinafter relative to non-limitative embodiments and the attached drawings, wherein show:

FIGS. 3a and 3b diagrammatic perspective views showing how the thin films of the refractory shields can elastically deform in a longitudinal direction and optionally in a transverse direction.

FIG. 13b A diagrammatic perspective view of the rigid part of the insulating layer of FIG. 13a.

DETAILED DESCRIPTION OF THE PREFERRED EMBODIMENTS

Figure 1:
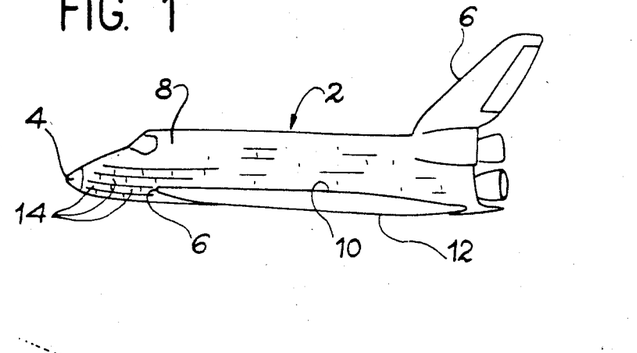
FIG. 1 A diagrammatic view showing an aircraft or spacecraft, which can be equipped with thermal protection members according to the invention.

FIG. 1 shows a spacecraft for carrying out an orbital flight and then returning to earth once the program of experiments has been completed. It could also be a craft intended for suborbital flight. On reentry into the atmosphere, said craft is subject to very great heating at nose 4, as well as on the leading edges 6 of the wings and fins and on the wing lower surface 12 of the craft, whilst the heating is less significant along the fuselage 8 and on the wing upper surface 10. The thermal protection members according to the invention apply more particularly to fuselage 8 and to surfaces 10 and 12 of the craft, but this still makes it possible to cover most of its surface.

Figures 2, 3:
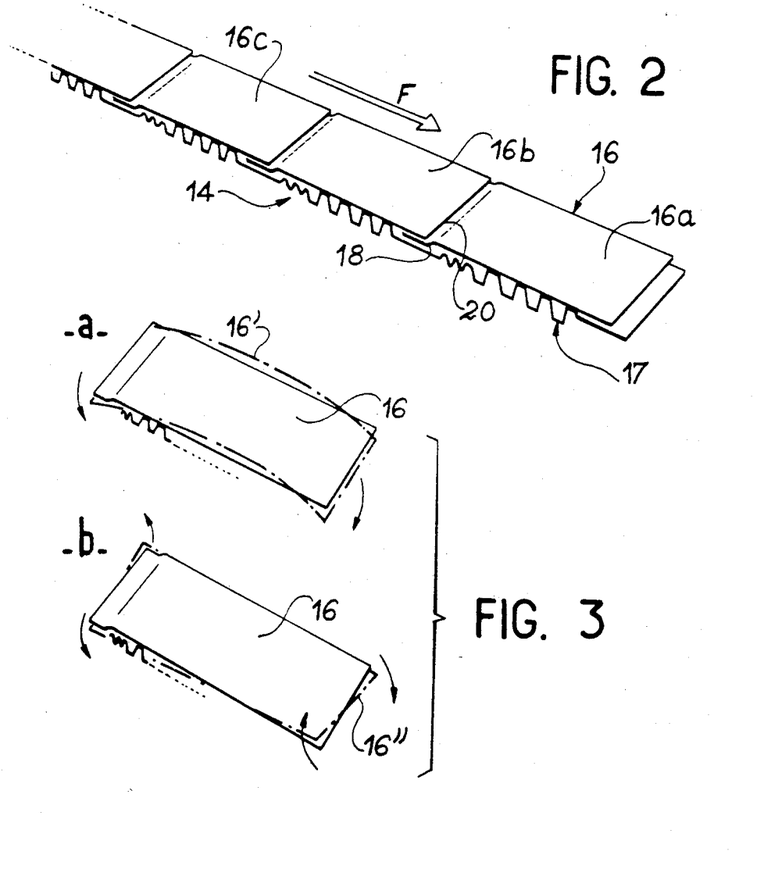
FIG. 2 A diagrammatic perspective view showing an embodiment of a refractory shield used in a protection member according to the invention.

On referring to FIG. 2, it can be seen that in the preferred embodiment, a refractory shield 14 according to the invention comprises a group of rectangular thin films 16 placed one following the other so as to form a strip (films 16a, 16b, 16c, etc. in the drawing). Each film 16 is reinforced on its lower face by a corrugated sheet 17, so as to improve the rigidity, whilst retaining an adequate flexibility. FIG. 2 also shows that each film (e.g. film 16a in the right-hand part thereof) is provided at one of its ends with a break, dislocation or displacement 18, which passes freely beneath the corresponding edge 20 of the following film 16b. This arrangement enables each of the films 16 to expand freely at the time of reentering the atmosphere when the craft is subject to great heating. Each film 16 can deform so as to adapt to the curvature of the craft, which makes it possible to use a complete strip along the fuselage, nose and up to the tail of the craft or, for practical reasons, a succession of shorter strips. The air flow direction is indicated by arrow F in FIG. 2 and it is clear that the shape given to break 18 prevents the plasma from penetrating beneath the films 16.

FIGS. 3a and 3b show how the films 16 can deform to adapt to the curvature of the craft. FIG. 3a shows that film 16 can bend or fold longitudinally and arrive in the deformed position 16' shown in mixed line form. In FIG. 3b, film 16 has a slight bend and reaches position 16", which is also shown in mixed line form. For the clarity of the drawing, the curvature of lines 16' and 16" has been exaggerated but in reality, the deformations are much less pronounced. The structure of the craft is curved in both directions, so that adaptation takes place by longitudinal bending and buckling of the refractory shields. This effect can be brought about by producing the refractory shields with a slight curvature or by producing planar members and the curvature can optionally be given by the fixing means.

Figure 4:
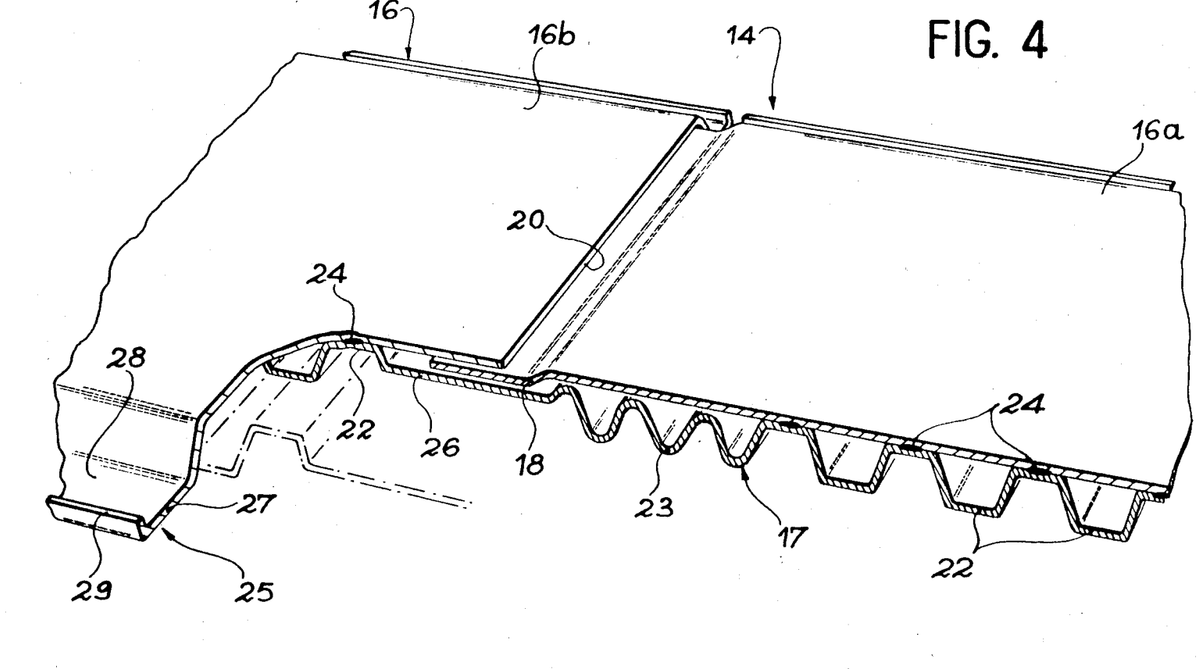
FIG. 4 A diagrammatic perspective and part sectional view of a refractory shield according to the invention on a larger scale.

The member illustrated in FIG. 2 can be seen better on the larger scale view of FIG. 4 showing the contact zone between two consecutive films 16a, 16b. It is possible to see the break 18 of film 16a which passes beneath edge 20 of film 16b without hard friction, which makes it possible to bring about the linear expansion of films 16a, 16b. FIG. 4 also shows that the corrugated sheet 17 acting as a rigidifying or stiffening means comprises several parts, namely a first part 22, whose corrugations are assembled at 24 with film 16a, a corrugated part 23 in the vicinity of the end of the film 16a corresponding to break 18 and a planar part 26 beneath break 18, which continues by a new part 22 assembled with film 16b. For example, it is possible to use a 0.1 mm thick undulated sheet, the pitch and height of the undulations or corrugations of part 22 being approximately 8 to 10 mm. The length of the planar part 26 is adequate to leave a space permitting the relative expansion of films 16a and 16b at break 18. Part 23 of sheet 17 is not in contact with film 16a, so that part 23 behaves like a bellows enabling sheet 17 to absorb expansions of the films 16a and 16b.

Obviously, this is only an embodiment and it would not pass beyond the scope of the invention to eliminate bellows 23 and planar part 26, films 16a and 16b still covering one another, but. It would also not fall outside the scope of the invention to eliminate sheet 17.

FIG. 4 shows that the edge 25 of each film 16 is in the form of a flange 27 forming a channel 28 limited by a border 29. The advantage of this shape will be described hereinafter when describing the means for fixing the refractory shields 14 to the structure of the craft.

Figure 5:
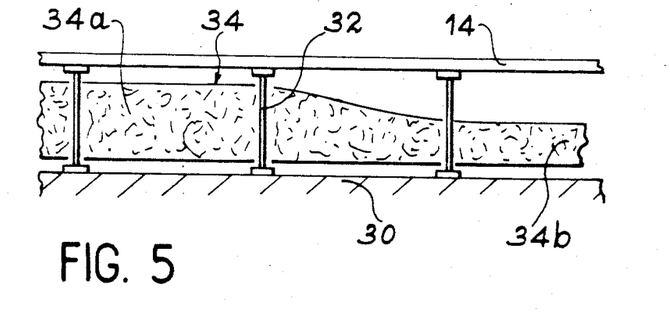
FIG. 5 A diagrammatic profile view showing the relative arrangement of the components.

FIG. 5 is a diagram showing the way in which the thermal protection members according to the invention are fitted. It can be seen that the refractory shields 14 are fixed to the craft structure 13 by fixing means 32, to be described hereinafter, whilst the insulating layer 34 is placed between structure 30 and refractory shields 14. Preferably, these are the same fixing members 32 as are used for fixing films 16 and insulating layer 34. FIG. 5 shows that it is possible to vary the thickness of layer 34 as a function of the temperature reached in the different areas of the craft which it covers. For example, in FIG. 5, the layer is thick in the left-hand part 34a and much thinner in the right-hand part 34b thereof. Thus, it is possible to act on the thickness of the insulating layer without modifying the installation of the heat shields 14, which simplifies construction and installation of the thermal protection.

Figure 6:
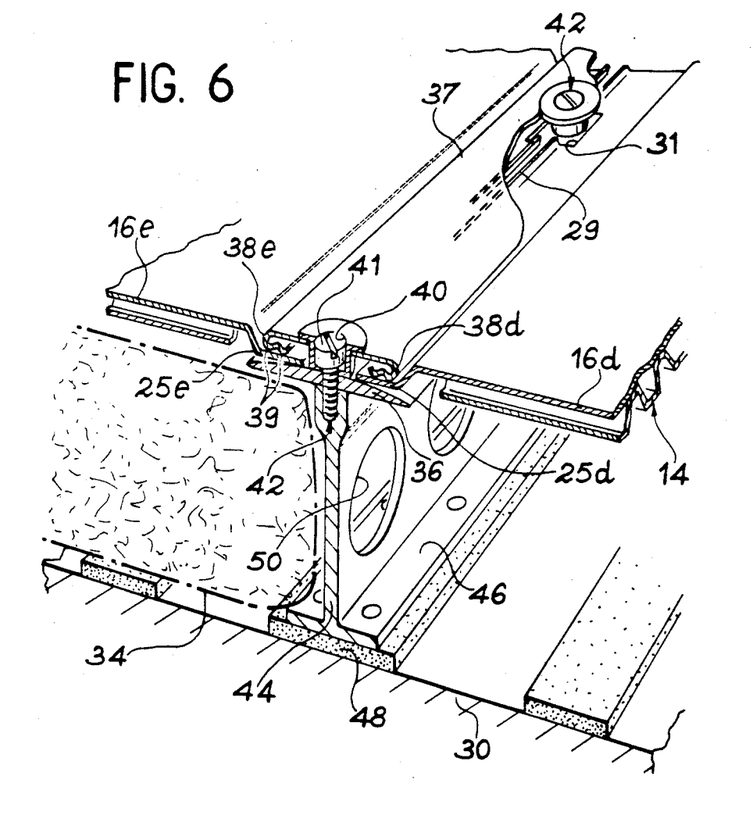
FIG. 6 A diagrammatic sectional, perspective view of a first means for fixing the refractory shields to the structure of the craft.

FIG. 6 illustrates a first method of fixing the refractory shields 14 to the structure of the craft. In the left-hand part thereof, it is possible to see the insulating layer 34 placed between a refractory shield and the structure of the craft. In this variant, the fixing means essentially comprise an elongated ramp 36 having two parallel edges on which respectively rest the longitudinal edges 25d and 25e of two adjacent films 16d and 16e. The maintaining of edges 25d, 25e of films 16d, 16e on the ramp 36 is ensured by a shaped section 37 having curved edges 38d, 38e disposed in such a way that edges 25d, 25e are located between ramp 36 and curved edges 38d, 38e respectively. In addition, the curved edges 38 have corrugations 39, which gives them a certain flexibility and enables them to maintain the edges 25 bearing on ramp 36 when shaped section 37 is maintained on ramp 36.

The application force of curved edges 38 on edges 25 of the refractory shields is sufficient to maintain them in engagement on ramp 36, but is not too high so that edges 25 can slide freely with respect to the curved edges 38 of the shaped section, when the refractory shields expand in the transverse direction.

FIG. 6 shows that along shaped section 37 there are a certain number of holes or bores 40 for the passage of screws 42 making it possible on the one hand to maintain shaped section 37 on ramp 36 and on the other hand ramp 36 on a shaped section 44. The latter is mounted on the structure 30 of the craft as a result of a base 46 resting on the structure via an insulating shim 48. Moreover, there are several recesses 50 in the shaped section, in order to lighten the latter.

FIG. 6 also shows that the borders 29 of films 16d, 16e are very close to one another, the distance between them being just sufficient to permit the expansion of the refractory shields during heating. To permit the passage of bores 40, there are notches such as 31 on the longitudinal edges of films 16. Thus, e.g. there can be one notch on each edge at mid-length of films 16, but it would not fall outside the scope of the invention to modify the number and position of the notches.

The depth of the bores 40 is substantially equal to the height of head 41 of screw 42. This arrangement makes it possible to reduce aerodynamic disturbances and is made possible due to the very limited thickness of films 16 and shaped section 37. The height of the latter and consequently the depth of channel 28 are a few millimetres. In the variant of FIG. 7a, it is once again possible to see ramp 36 on which rest edges 25d, 25e of film 16d, 16e due to shaped section 37. However, ramp 36 is no longer maintained by a shaped section, but is instead secured by a group of pedestal-like feet 52 resting on the craft structure 30 via a base 56 resting on an insulating shim 48. The pedestal-like feet are also fixed to ramp 36, e.g. with not shown screws. Ramp 36 has two upwardly directed edges 36a and the interest of this arrangement will be described relative to FIG. 8a. Screws 42 also no longer serve to screw the ramp in the shaped section and are instead held by a nut 54. The distance between two consecutive feet 52 can vary in the case of an accident or incident of the craft structure e.g. due to the presence of structural frames, supports within the structure, pipes, doors or other means.

Figure 7A:
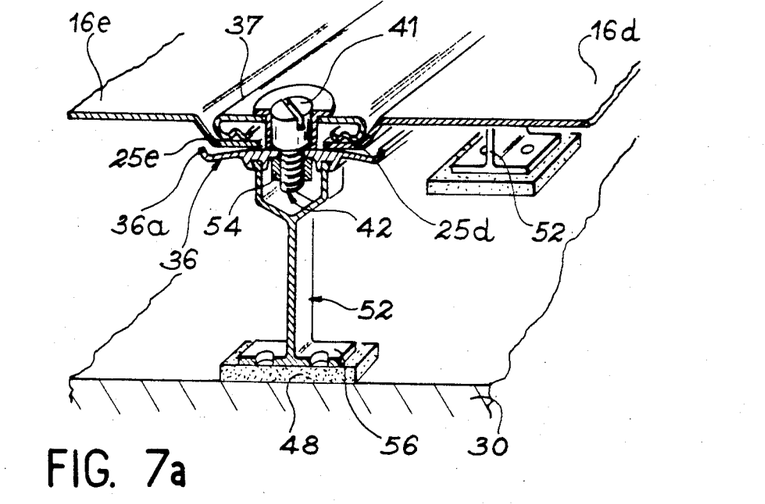
FIG. 7a A view similar to FIG. 6 showing a second means for fixing the refractory shields to the structure of the craft, the ramp resting on pedestal-like feet.
Figure 7B:
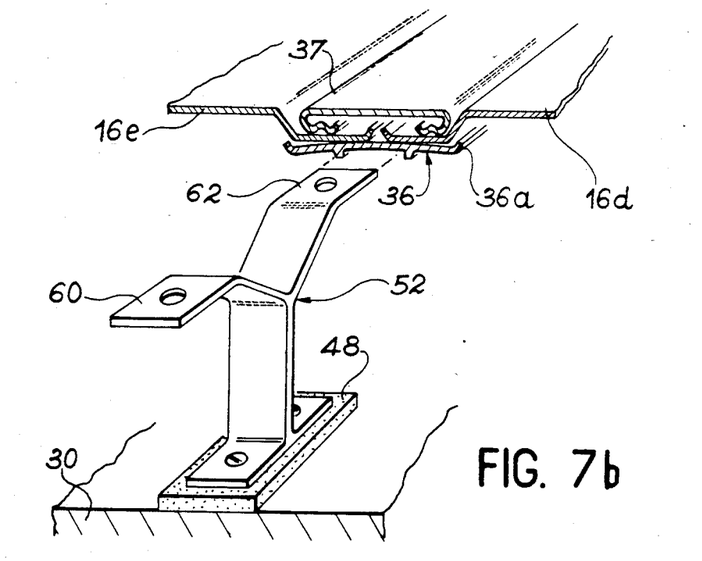
FIG. 7b A view similar to FIG. 7a showing another possible arrangement for the pedestal-like feet supporting the ramp.

In the case of FIG. 7b, pedestal-like feet 52 are similar to those of FIG. 7a, except that they have two tabs 60, 62 placed in the longitudinal direction of ramp 36, which is fixed to each of the tabs 60, 62. It is also possible to use pedestal-like feet only having a single fixing tab.

Figure 8A:
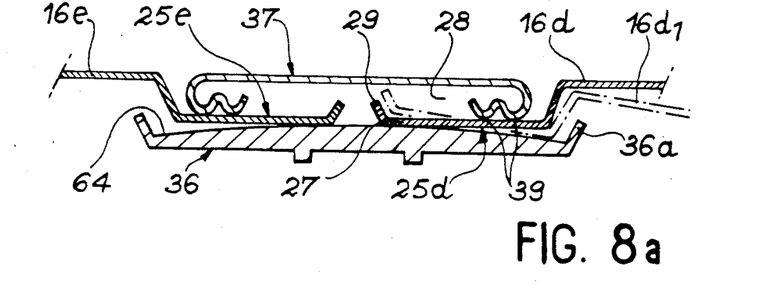
FIG. 8a A diagrammatic sectional view of the embodiment of FIGS. 7a or 7b in an area where there are no fixing screws for the shaped section on the ramp.

The manner in which the edges of the films 16 are maintained on ramp 36 will become more readily apparent from the sectional view of FIG. 8a, where it is shown that edges 25d, 25e of the films rest on the upper surface 64 of ramp 36.

This surface is preferably curved enabling it to optionally receive the edges of two films 16 which are not coplanar, e.g. film 16e and film $16d_1$, the latter being diagrammatically represented in mixed line form in the right-hand part of the drawing.

Figure 8B:
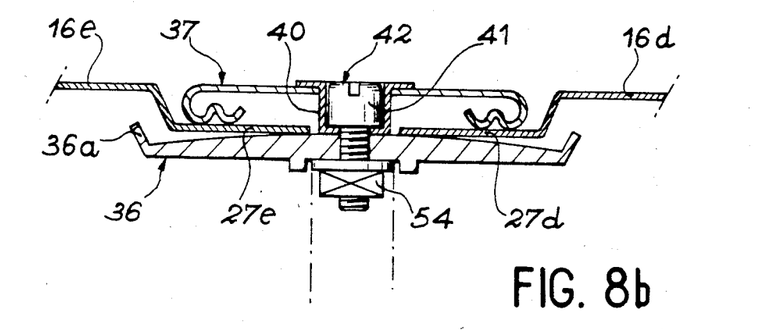
FIG. 8b A view similar to FIG. 8a in an area where there is a fixing screw for the shaped section on the ramp.

It can also be seen that the corrugations 39 along the edges of the shaped section 37 bear on flanges 27 within channels 28. Corrugations 39 simple bear on flanges 27 and the latter bear on the upper surface 64 of ramp 36. Thus, during heating, the different parts which can slide with respect to one another make it possible to absorb the expansions. Moreover, the presence of the corrugations 39 bearing on flange 27 limits the penetration of water beneath shaped section 37 and the borders 36a of ramp 36 make it possible to channel water which may have accidentally penetrated. The total height of shaped section 37 corresponds to the depth of channel 28, so that the upper surfaces of section 37 and films 16 are substantially in the extension of one another, so as to not prejudice the aerodynamic characteristics of the craft. FIG. 8b, similar to FIG. 8a, illustrates the same arrangement, but at the location of a fixing screw 42. It can be seen that the latter is placed within a bore 40 and maintained on ramp 36 by a nut 54. It is at the time when the screws 42 are fitted that bore 40 is applied to ramp 36 and causes the application of shaped section 37 to flanges 27d and 27e of films 16d, 16e.

Figure 9:
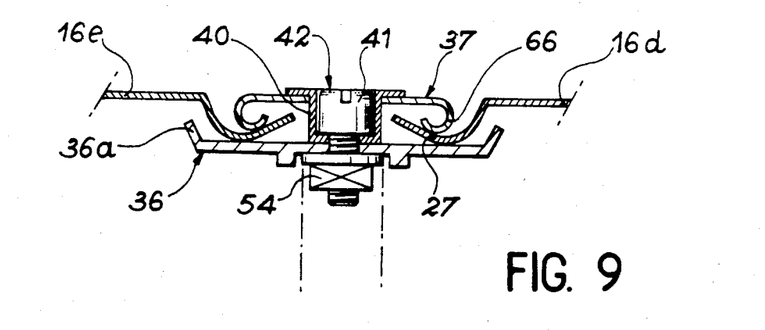
FIG. 9 A view similar to FIGS. 8a and 8b illustrating another form of the maintaining shaped section and the edge of the thin films.

In the case of FIG. 9, the edges of shaped section 37 have no corrugations and instead have a simple curvature 66, whilst flange 27 of film 16 is curved and not planar as in the case of FIGS. 8a and 8b. Edge 66 still bears on flange 27 and the operation is the same as hereinbefore. In the case of FIG. 9, the height of the head of screw 41 is equal to the depth of bore 40.

Figure 10:
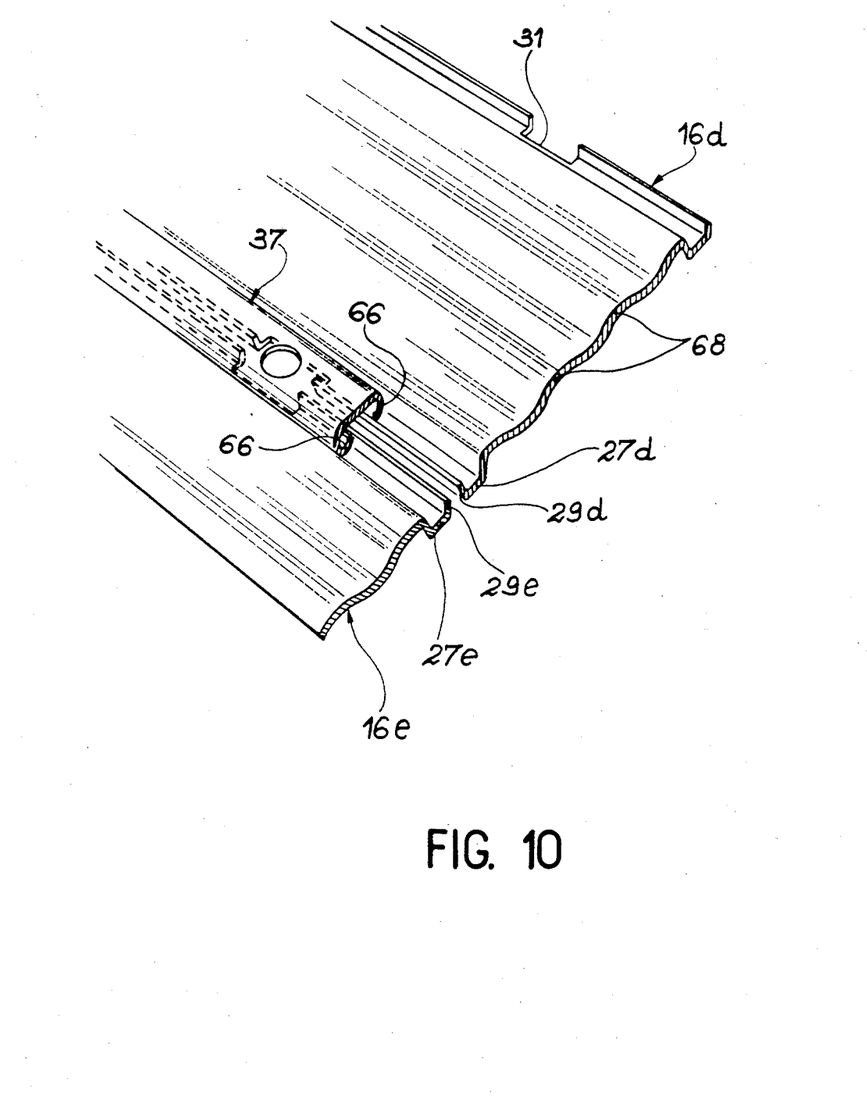
FIG. 10 A diagrammatic perspective view showing a thin film with longitudinal corrugations.

FIG. 10 illustrates a variant in which films 16d and 16e have small longitudinal corrugations 68 making it possible to absorb the expansion in the transverse direction without disturbing the aerodynamic flow. In this case, it is preferable not to use a stiffener like the corrugated sheet 17 illustrated in FIG. 4, because this might be prejudicial to expansion. In this variant, preference is given to the use of a shaped section 37 similar to that of FIG. 9 with two curved edges 66.

Figure 11:
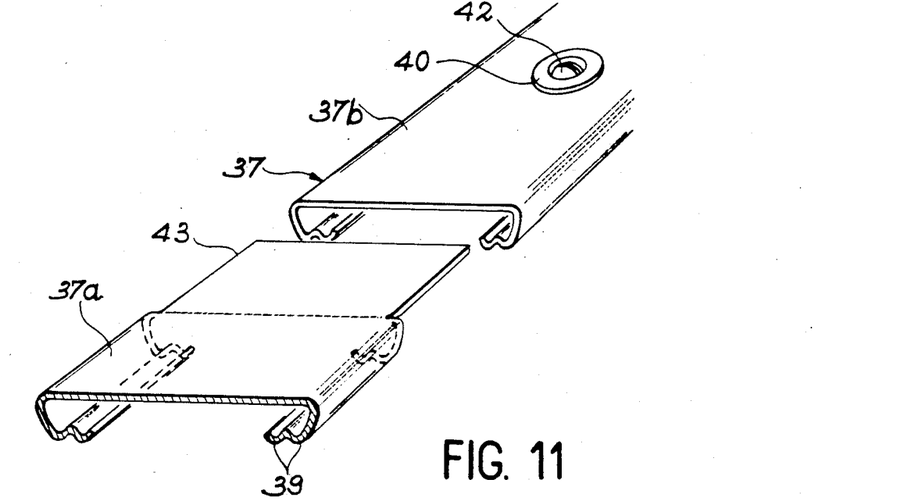
FIG. 11 A diagrammatic perspective view showing in greater detail the structure of the shaped section used for maintaining the edge of the refractory shields on the ramp.

The perspective view of FIG. 11 shows that in the preferred embodiment, shaped section 37 is formed from elements fitted in to one another. This figure illustrates the connection between two elements 37a, 37b. It can be seen that at the end of element 37a, the edges thereof and consequently the corrugations 39 have been cut off so as to provide a tongue 43. The latter penetrates beneath element 37b, so that the continuity between the upper surfaces of elements 37a, 37b is maintained. Obviously, this construction can also be used with the embodiment of FIG. 9.

Figure 12:
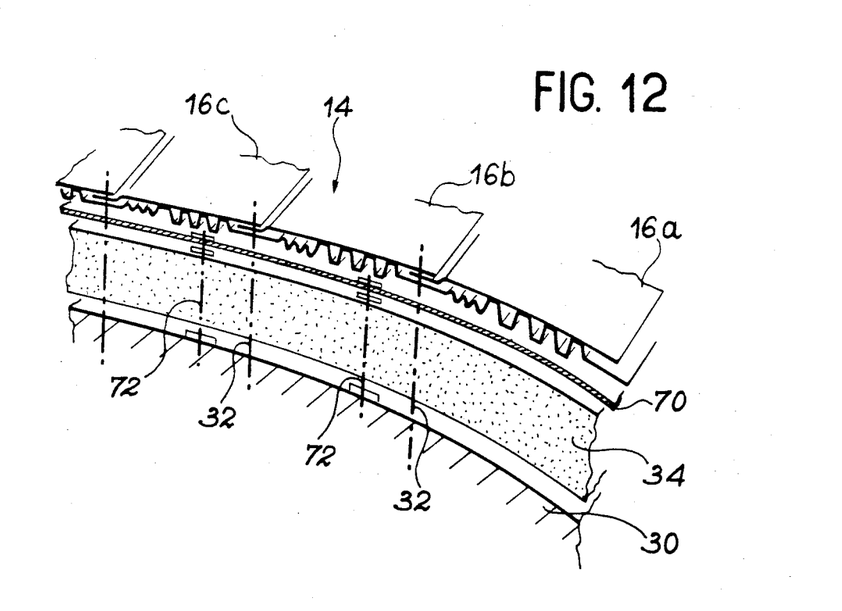
FIG. 12 A diagrammatic sectional, perspective view showing how it is possible to place a supplementary sheet between the refractory shield and the insulating layer.

FIG. 12 shows how it is possible to complete the device by a supplementary sheet serving as an emergency thermal protection. It is possible to see the refractory shield 14 constituted by thin films 16a, 16b, 16c, etc. mounted on the craft structure 30 by fixing means 32 shown diagrammatically in mixed line form. The fixing means 32 are also used for securing insulating layer 34. A supplementary refractory metal sheet 70 is inserted between shield 14 and layer 34 and is maintained on structure 30 by fixing means 72, also shown in mixed line form. The function of supplementary sheet 70 is to serve as an emergency heat barrier in the case of an accidental tearing away of part of shield 14 and for this reason is not mechanically joined thereto. The presence of sheet 70 enables the craft to remain intact after landing, even if the sheet 70 is damaged or deformed. It would obviously not pass outside the scope of the invention to place sheet 70 at another point, e.g. between insulating layer 34 and structure 30.

Figure 13A:
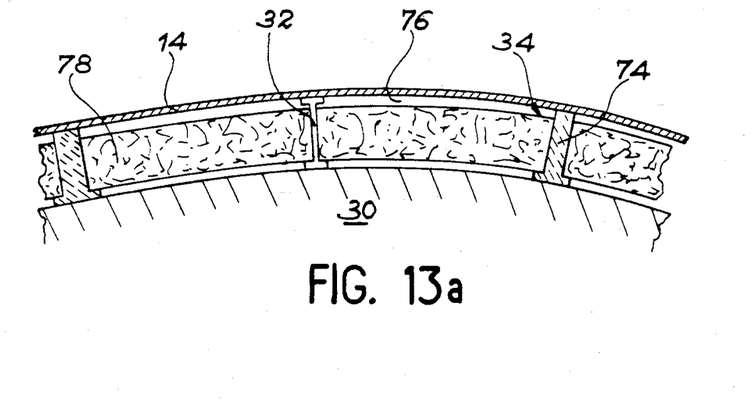
FIG. 13a A diagrammatic profile view showing how the insulating layer can be produced in hybrid form.
Figure 13B:
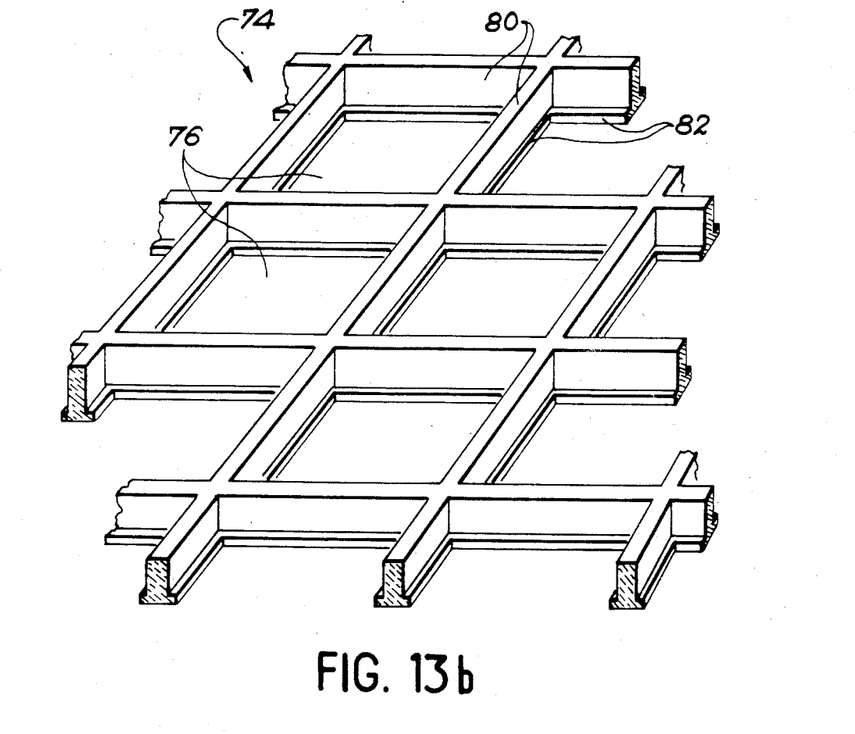

Finally, FIGS. 13a and 13b show how the insulating layer 34 can be produced in a hybrid form. FIG. 13a shows the refractory shield 14 fixed to the structure 30 of the craft by fixing means 32. In this variant, insulating layer 34 is constituted on the one hand by a rigid wafered sheet 74 on which bears the refractory shield 14, said sheet defining on the surface to be protected contiguous pocket 76 and on the other hand flexible members 78 placed in the thus defined pockets. The wafered sheet 74 is constituted by a group of rigid walls 80 arranged substantially perpendicularly to the structure 30 of the craft and to the refractory shield 14, the latter bearing on rigid walls 80. On the side of structure 30, the latter have a border 82 on which rests the flexible members 78. The means 32 for fixing the refractory shield 40 can also be used for fixing flexible members 78. In the represented embodiment, pockets 76 are in the form of a square, whose side length is approximately 30 to 40 cm, but it would not pass outside the scope of the invention to modify the shape and dimensions of the pockets. Finally, such an arrangement is usable both when the surface to be protected is planar (FIG. 13b) and when it is curved (FIG. 13a).

The thermal protection member according to the invention has numerous advantages, the most important of which is the simplification of the definition, development, production and inspection work with respect to the refractory shield. Thus, these standardized members can be produced industrially by conventional methods, which reduces design, production and installation costs, because with sheets or films having identical shapes and dimensions, it is possible to cover a very large part of the surface of the craft. Furthermore, due to the flexibility of the films, there is no need to redefine the thermal protection in the case where the craft shape was changed during the project. In the case of tiles or rigid members, on changing the shape or curvature of the structure of the craft, it is necessary to redefine the tiles or rigid members, which leads to delays and increases research costs. The same problem occurs if there are changes to the internal or external arrangement of the aircraft, i.e. the shape and location of doors, hatches, canopies, supports or frames within the means. In the case of tiles or rigid members, everything has to be redone, whereas in the invention it is sufficient to change the location of the pedestal-like feet or supports 52 (FIGS. 7a and 7b) and possibly differently cut the films and insulating layer. Furthermore, with the invention, the number of spares is reduced, because the films 16 can be identical or almost identical, whereas with the tile system it is necessary to have one or two spares for each tile, because they are virtually all different.

Another vital advanatage of the invention is that the thermal protection elements are light, the surface mass of such an element being approximately 5 to 6 kg/m² in areas at 1000° C. using thin metal films. This protection copes well with the overall deformations of the aircraft, as well as local deformations of the underlying structure, which makes it possible to lighten the latter (local buckling being acceptable). This also copes well with the faults in the surface to be protected, which in particular makes it unnecessary to seal the fuselage with mastic or putty, which increases the overall costs of the structures and protection. Moreover, the protection according to the invention has a good resistance to environmentally caused or aerodynamic vibrations, as well as to aerodynamic stresses, which are variable between individual points of the aircraft and which also vary over a period of time during the atmosphere reentry phase.

Furthermore, the thermal protection according to the invention adequately resists shock and vibration without suffering any variation in its characteristics, particularly in the case of rain, hail, lightning, and effectively protects the means against disturbances. The construction of the thermal protection according to the invention makes it possible to have a regular external surface (i.e. few aerodynamic disturbances) and a good seal with respect to water and the plasma.

Moreover, such a system is more reliable than the prior art means. Thus, in view of the fact that all the elements are identical or almost identical, this leads to a simplification and standardization of the production and inspection processes. Moreover, the total length of the junctions is smaller than in the case where tiles are used. As the junctions of the outer member do not necessarily coincide with the possible junctions of the insulating layer, the support is better corrected. In addition, the absence of any bonding increases safety and reliability. On using a supplementary protective sheet placed between the insulating layer and the refractory shield, the fuselage would be completely protected against destruction. The inspection and rehabilitation operations for the craft between two flights are much simpler and faster and consequently less expensive than in the case of using tiles. This results from the standardization and the fact that each element is immediately accessible and easily inspectable, each part being visible and none inaccessible. Dismantling for examination and possible replacement of the refractory shields is easy, because there is no need to dismantle adjacent shields. Finally, the thermal protection members according to the invention are reusable, either on the same craft or object, or on a different craft or object.

Although the above description relates to the particular application to aircraft and spacecraft, the thermal protection members according to the invention can be used on any object subject to great heating, e.g. an object located in a plasma wind tunnel.

What is claimed is:

1. A reusable lightweight thermal protection member for protecting an area of an object to great heating, said member having a plurality of sheetlike, refractory shields having relatively large surface areas, means for fixing said refractory shields to the object, an insulating layer placed between the refractory shields and the object, and means for fixing the insulating layer to the object, wherein the refractory shields each comprise at least one thin film of refractory material having an adequate flexibility to adapt to the shape of the object in the area to be protected in at least one direction, said resultant thermal protection member having a surface mass not greater than 6 Kg/m².

2. A reusable thermal protection member according to claim 1, wherein said film is made from a refractory metal.

3. A reusable thermal protection member according to claim 2, wherein the refractory metal is chosen from the group constituted by niobium, titanium, tantalum and their alloys and nickel or chromium-based alloys.

4. A reusable thermal protection member according to claim 1, wherein the film is made from a fibre-based composite material.

5. A reusable thermal protection member according to claim 1, wherein the film is rectangular.

6. A reusable thermal protection member according to claim 1, wherein the film is equipped with stiffening means.

7. A reusable protection member according to claim 6, wherein the stiffening means comprise a sheet fixed to the face of the film facing the insulating layer.

8. A reusable thermal protection member according to claim 1, wherein it comprises a supplementary sheet for improving the mechanical strength of the refractory shield.

9. A reusable thermal protection member according to claim 1, wherein it has means for absorbing the expansion of the refractory shield in at least one direction.

10. A reusable thermal protection member according to claim 9, wherein at least two films are placed one following the other, one of these films having at one end a break, dislocation or displacement able to freely engage beneath the corresponding edge of the other film, thus making it possible to absorb the expansion of the two films in the linear direction.

11. A reusable thermal protection member according to claim 9, wherein the film has longitudinal corrugations making it possible to absorb expansions in the transverse direction.

12. A reusable thermal protection member according to claim 1, wherein the means for fixing the refractory shield to said object fulfil at least one of the following functions:
   participating in maintaining and/or creating the curvature of the refractory shields;
   participating in the mechanical strength of the refractory shields;
   tolerating linear and transverse expansions of the refractory shields;
   permitting the contiguous fitting of the refractory shields, whereof the films are not coplanar; and
   ensuring relative sealing with respect to the air, water and plasma.

13. A reusable thermal protection member according to claim 1, wherein the means for fixing the refractory shield to the object comprise an elongated ramp on which is placed the edge of the refractory shield, means for fixing said ramp to the object and means for maintaining the edge of the refractory shield on the ramp.

14. A reusable thermal protection member according to claim 13, wherein the means for fixing the ramp to the object comprise a shaped section, fixed to said object and on which is mounted said ramp.

15. A reusable thermal protection member according to claim 13, wherein the means for fixing the ramp to the object comprise a group of pedestal-like feet or supports fixed to said object and on which is mounted said ramp.

16. A reusable thermal protection member according to claim 13, wherein the surface of the ramp on which is placed the edge of at least one refractory shield is curved, so as to be able to maintain in place two refractory shields, whereof the films are not coplanar.

17. A reusable thermal protection member according to claim 13, wherein the means for maintaining the edge of refractory shield on the ramp comprise a shaped section fixed to the ramp, said shaped section having at least one curved edge arranged in such a way that the edge of the refractory shield can be positioned between the edge of the shaped section and the ramp, said curved edge having an adequate flexibility to apply the edge of the refractory shield to the ramp, whilst permitting the expansion of said refractory shield.

18. A reusable thermal protection member according to claim 1, wherein the means for fixing the refractory shield to the object are also used for fixing the insulating layer to said object.

19. A reusable thermal protection member according to claim 1, wherein it comprises a supplementary sheet serving as an emergency thermal protection.

20. A reusable thermal protection member according to claim 1, wherein the insulating layer placed between the refractory shield and the object is positioned within a protective bag.

21. A reusable thermal protection member according to claim 1, wherein the insulating layer is flexible.

22. A reusable thermal protection member according to claim 1, wherein the insulating layer is rigid and can also serve as a support for the refractory shield to aid the forming or maintaining of the curvature of the latter.

23. A reusable thermal protection member according to claim 1, wherein the insulating layer a hybrid, i.e. partly rigid and partly flexible.

24. A reusable thermal protection member according to claim 23, wherein the insulating layer is partly rigid and produced in the form of a wafered sheet, in this way defining contiguous pockets on the surface to be protected and is partly flexible in said pockets.

* * * * *